US012800316B2

(12) United States Patent
Aidan

(10) Patent No.: US 12,800,316 B2
(45) Date of Patent: Nov. 17, 2026

(54) COSMETIC APPLICATION DRONE SYSTEM

(71) Applicant: ELC MANAGEMENT LLC, Melville, NY (US)

(72) Inventor: Christopher Aidan, Austin, TX (US)

(73) Assignee: ELC MANAGEMENT LLC, Melville, NY (US)

( * ) Notice: Subject to any disclaimer, the term of this patent is extended or adjusted under 35 U.S.C. 154(b) by 295 days.

(21) Appl. No.: 18/622,809

(22) Filed: Mar. 29, 2024

(65) Prior Publication Data

US 2025/0305829 A1 Oct. 2, 2025

(51) Int. Cl.

| | |
|---|---|
| ***G01C 21/20*** | (2006.01) |
| ***A45D 34/04*** | (2006.01) |
| ***A45D 44/00*** | (2006.01) |
| ***G06V 40/16*** | (2022.01) |

(52) U.S. Cl.

CPC ............. *G01C 21/20* (2013.01); *A45D 34/04* (2013.01); *A45D 44/00* (2013.01); *A45D 2044/007* (2013.01); *A45D 2200/10* (2013.01); *G06V 40/161* (2022.01)

(58) Field of Classification Search

CPC ........ G01C 21/20; A45D 34/04; A45D 44/00; A45D 2044/007; A45D 2200/10; A45D 2200/057; A45D 44/005; G06V 40/161

See application file for complete search history.

(56) References Cited

U.S. PATENT DOCUMENTS

2014/0305466 A1* 10/2014 Silva ...................... A45D 40/24 132/314
2016/0318607 A1* 11/2016 Desai ...................... A01M 7/00
2017/0259920 A1* 9/2017 Lai ........................... B64D 1/18
2018/0068173 A1* 3/2018 Kolleri ................... G06Q 10/10
2018/0164610 A1* 6/2018 Liang .................. H04N 13/204
2020/0113166 A1* 4/2020 Warren, Jr. ......... A01M 7/0014
2020/0154871 A1* 5/2020 Reyzis ................. A46B 5/0095
2020/0222929 A1* 7/2020 Beardsley ............... B05B 12/00
2021/0258534 A1* 8/2021 Lin ........................ G06V 20/40
2022/0169387 A1* 6/2022 Van Der Steur ...... B05B 12/122
2023/0132201 A1* 4/2023 Chekh .................. A61B 5/0088 345/419
2023/0154083 A1* 5/2023 Zou ......................... G06T 11/60 345/634

(Continued)

FOREIGN PATENT DOCUMENTS

WO WO-2022018790 A1 * 1/2022 ............. B64U 10/13

*Primary Examiner* — Amandeep Saini
*Assistant Examiner* — Andrew S Budisalich
(74) *Attorney, Agent, or Firm* — MARSHALL, GERSTEIN & BORUN LLP

(57) ABSTRACT

A cosmetic application drone includes a drone body, at least one sensor connected to the drone body, a navigation system connected to the drone body, a cosmetic housing connected to the drone body, a cosmetic distribution system connected to the drone body, and a controller in communication with the at least one sensor, the navigation system, the cosmetic distribution system, and a memory. The controller controls the at least one sensor and the navigation system to fly and collect sensor data relating to the face of the user. The controller stores and generates a face map from the sensor data. The controller further controls the navigation system and the cosmetic distribution system to apply a cosmetic to the user using the face map.

13 Claims, 5 Drawing Sheets

(56) References Cited

U.S. PATENT DOCUMENTS

| | | | | |
|---|---|---|---|---|
| 2023/0350434 | A1* | 11/2023 | Fliszar | B64C 39/024 |
| 2024/0044651 | A1* | 2/2024 | Stasiowski | G01C 21/20 |
| 2024/0331294 | A1* | 10/2024 | Cadet | G06T 13/40 |
| 2024/0365767 | A1* | 11/2024 | Schwartz | A01M 1/2022 |
| 2025/0214250 | A1* | 7/2025 | Shalah-Abboud | B25J 9/1679 |

* cited by examiner

COSMETIC APPLICATION DRONE SYSTEM

FIELD OF THE DISCLOSURE

The present disclosure generally relates to automated cosmetic application devices and systems. More specifically, the present disclosure relates to a cosmetic application drone and a drone-based cosmetic application system.

BACKGROUND

Cosmetics are traditionally applied by hand using a variety of different devices (e.g., brushes, applicators, sponges, etc.). Knowledge is required to know how much cosmetic to use, which applicator is most appropriate, what technique should be used, and skill is necessary to execute a chosen technique with a steady hand. Achieving professional-quality results sometimes necessitates the services of a makeup artist, which can be expensive and inconvenient.

SUMMARY

Examples within the scope of the present disclosure are directed to approaches for distributing a cosmetic using a cosmetic application drone system.

In an example, a cosmetic application drone includes a drone body, at least one sensor connected to the drone body, the at least one sensor configured to collect sensor data, a navigation system connected to the drone body, a cosmetic housing connected to the drone body, a cosmetic distribution system connected to the drone body, and a controller in communication with the at least one sensor, the navigation system, the cosmetic distribution system. The controller includes a non-transitory memory and one or more processors. The non-transitory memory stores instructions that, when executed by the one or more processors, cause the controller to: control the navigation system to fly the cosmetic application drone to collect sensor data relating to a face, store the sensor data relating to the face in the memory, generate a face map from the sensor data relating to the face, and control the navigation system and the cosmetic distribution system to apply a cosmetic to the user using the face map.

In an approach, the sensor data relating to the face may include at least one of face topography, skin tone, and skin texture.

In an approach, the cosmetic housing may be configured to hold at least one of a foundation, concealer, eyeshadow, eyeliner, mascara, blush, and lipstick.

In an approach, the cosmetic distribution system may include an applicator device. The applicator device may be configured to secure a cosmetic applicator.

In an approach, the cosmetic applicator may be an airbrush nozzle.

In an approach, the cosmetic application drone may further include a rechargeable battery secured to the drone body and electrically connected to at least one of the at least one sensor, the navigation system, the cosmetic distribution system, and the controller.

In an approach, the at least one sensor may include a proximity sensor, and the instructions, when executed by the one or more processors, may cause the proximity sensor to collect sensor date relating to safety information. The instructions, when executed by the one or more processors, may further cause the controller to control at least one of the navigation system and the cosmetic distribution system based on the safety information.

In an approach, a lighting system may be connected to the drone body. The lighting system may be configured to provide light during makeup application.

In an approach, the instructions, when executed by the one or more processors, may further cause the controller to cease controlling at least one of the navigation system and the cosmetic distribution system when one of the cosmetic housing and the cosmetic distribution system is engaged manually by a user.

In an approach, the cosmetic distribution system may include a plurality of applicator devices, each applicator device configured to secure a cosmetic applicator. The instructions, when executed by the one or more processors, may further cause the controller to control the cosmetic distribution system to apply cosmetic to the user using more than one of the plurality of applicator devices simultaneously.

In an approach, the instructions, when executed by the one or more processors, may further cause the controller to control the navigation system and cosmetic distribution system to apply the cosmetic to more than one user.

In an approach, the cosmetic application drone may further include a camera system configured to capture images of a user's face, and the instructions, when executed by the one or more processors, may further cause the controller to analyze the images.

In an approach, the instructions, when executed by the one or more processors, may further cause the controller to control the navigation system and the cosmetic distribution system based on the analysis of the images.

In an example, a cosmetic application drone system includes a cosmetic application drone and a user input system. The cosmetic application drone includes a drone body, a navigation system connected to the drone body, a cosmetic housing connected to the drone body, a cosmetic distribution system connected to the drone body, a drone wireless communication system connected to the drone body, and a drone controller in communication with the navigation system, the cosmetic distribution system, and the wireless communication system. The drone controller includes a non-transitory memory and one or more processors. The user input system includes a control wireless communication system selectively in communication with the drone wireless communication system, a user interface, and an input controller in communication with the control wireless communication system. The input controller includes a non-transitory memory and one or more processors.

In an approach, the cosmetic application drone system may further include at least one sensor connected to the drone body. The non-transitory memory of the drone controller stores instructions that, when executed by the one or more processors of the drone controller, control the at least one sensor to collect sensor data relating to at least one of face topography, skin tone, and skin texture.

In an approach, one of the non-transitory memory of the input controller and the non-transitory memory of the drone controller may store instructions that, when executed by the one or more processors of the input controller or the one or more processors of the drone controller, cause the input controller or the drone controller to provide an application plan based on the sensor data.

In an approach, the non-transitory memory of the input controller may store instructions that, when executed by the one or more processors of the input controller, cause the user interface to display the application plan and cause the input controller to receive input from a user to change or approve the application plan.

In an approach, the application plan may also be based on at least one of previously approved application plans, expected lighting conditions, event information, and makeup style.

In an approach, the expected lighting conditions may be either collected as sensor data by the at least one sensor or entered into the user interface.

In an approach, the non-transitory memory of the input controller may store instructions that, when executed by the one or more processors of the input controller, cause the user interface to display a plurality of event types and a plurality of makeup styles, and wherein the event information is one of the plurality of event types displayed using the user interface and the makeup style is one of the plurality of styles displayed using the user interface.

In an approach, the non-transitory memory of the input controller may store instructions that, when executed by the one or more processors of the input controller, cause the user interface to provide at least one of tutorials, tips, and cosmetic recommendations based on the sensor data.

In an approach, the application plan may include at least one of a type of cosmetic, a shade of cosmetic, an application location, an applicator type, and a quantity of cosmetic.

In an approach, the cosmetic application drone system may include a plurality of cosmetic application drones, the plurality of drones configured to apply cosmetic to multiple users simultaneously or to apply cosmetic on a single user simultaneously.

In an example, a drone-based method of applying cosmetics by controlling a drone controller includes controlling, using the drone controller, a navigation system of the cosmetic application drone to fly the cosmetic application drone to collect sensor data relating to a face. The method includes, using the drone controller, controlling at least one sensor of the cosmetic application drone to collect the sensor data relating to the face. The method includes, using the drone controller, storing the sensor data relating to the face in a memory in communication with the drone controller. The method includes, using the drone controller, generating a face map from the sensor data relating to the face. The method includes receiving, using the drone controller, selections entered in a user interface of a user input system and communicated by an input controller of the user input system to the drone controller. The method includes controlling, using the drone controller, the navigation system of the cosmetic application drone and a cosmetic distribution system of the cosmetic application drone to apply a cosmetic based on the face map and the selections.

BRIEF DESCRIPTION OF THE DRAWINGS

The above needs are at least partially met through provision of one, more than one, or any combination of the approaches described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples. Also, common but well-understood elements that are useful or necessary in a commercially feasible examples are often not depicted to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various approaches, a cosmetic application drone is provided as part of a cosmetic application drone system that enables automated cosmetic application. The quality of the cosmetic application is high because the drone can collect sensor data regarding a user's face (e.g., face topography, skin tone, and skin texture) to inform the selection of appropriate cosmetics, applicators, and application techniques, and the drone is able to then execute application of the cosmetic according to a face map with a degree of precision that is difficult to achieve manually. A user can provide input via a user input system regarding, for example, expected lighting conditions, event information, and desired makeup style to ensure that the cosmetic application is customized to the user's preferences and appropriate for a given event. In this way, the cosmetic application drone system can apply cosmetics at a professional level without the expenses and inconveniences associated with hiring a professional cosmetologist.

Figure 1:
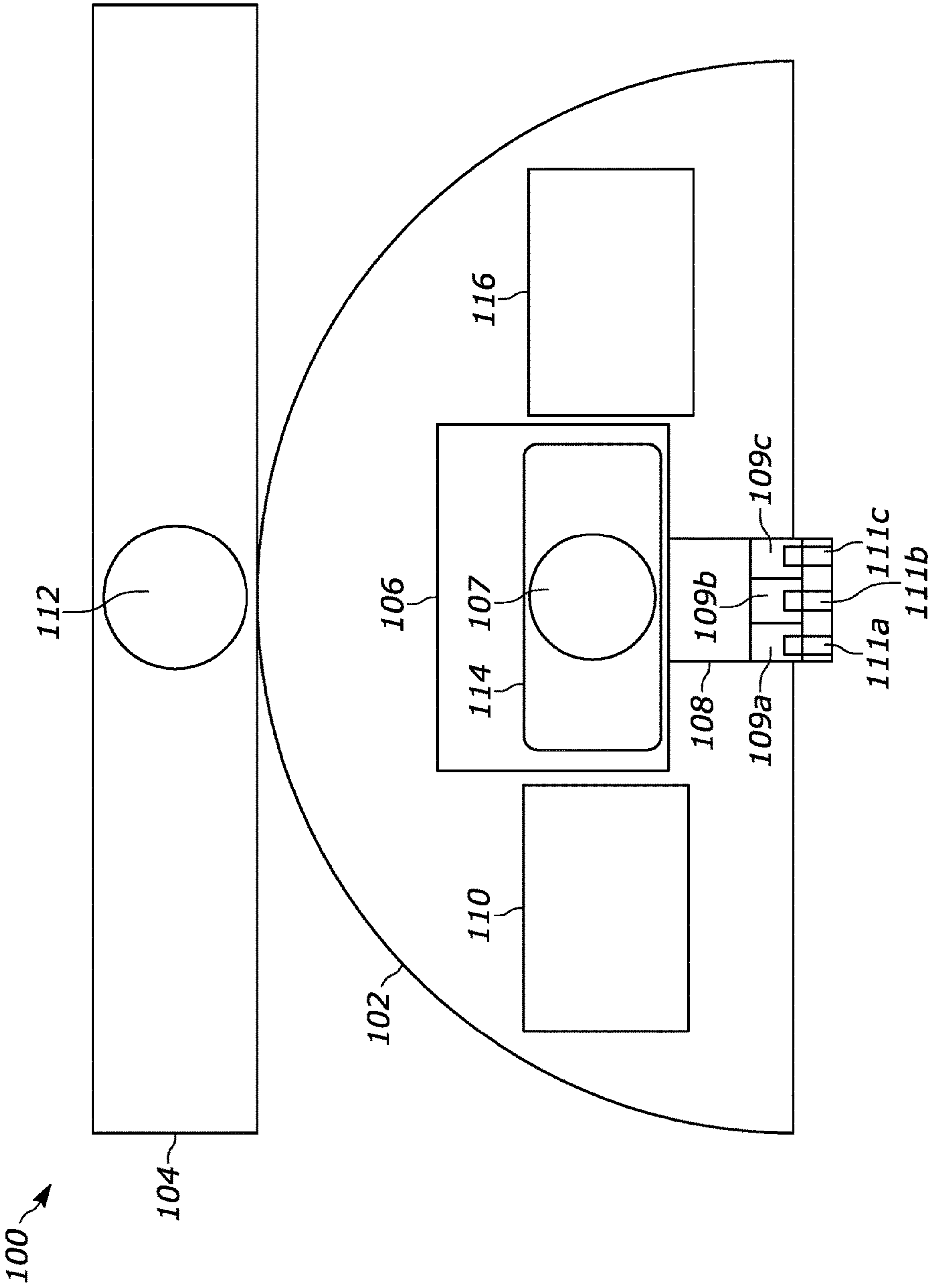
FIG. 1 illustrates schematically a cosmetic application drone in accordance with various examples.

FIG. 1 illustrates schematically a cosmetic application drone 100. As shown, the cosmetic application drone 100 includes a drone body 102. The drone body 102 is a frame or chassis that serves as the structural foundation for the cosmetic application drone 100. A navigation system 104 is connected to the drone body 102. The navigation system 104 includes the structural components necessary for the cosmetic application drone 100 to move through the air, such as a motor and a propeller. The navigation system 104 further includes components necessary to guide movement of the cosmetic application drone 100, such as a global positioning system (GPS), inertial measurement unit (IMU) that may include including accelerometers and gyroscopes to measure acceleration and angular rate, barometer and altitude sensors to measure changes in altitude, a compass to provide orientation information, and a vision system including a camera for obstacle detection.

A cosmetic housing 106 is connected to the drone body 102. In the arrangement shown in FIG. 1, the cosmetic housing 106 is positioned toward a center of the drone body 102. The cosmetic housing 106 is configured to hold a cosmetic 107, which may be a solid or a liquid. For example, the cosmetic 107 may be a foundation, concealer, eyeshadow, eyeliner, mascara, blush, or lipstick. In FIG. 1, the cosmetic housing 106 is configured to selectively secure and release a cosmetic container 114. The cosmetic container 114 is a container or device designed to hold and selectively release the cosmetic 107. In other arrangements, the cosmetic 107 may be directly placed within the cosmetic housing 106. In some arrangements, the cosmetic housing 106 may be configured to hold a plurality of cosmetics 107. A cosmetic distribution system 108 enables application of the cosmetic 107 from the cosmetic housing 106. The cosmetic distribution system 108 may include any mechanical or electronic features necessary to distribute the cosmetic 107, such as a pump, motor, mechanical support features, circuitry, passageway, or fan. The cosmetic distribution system 108 includes an applicator device 109 configured to secure a cosmetic applicator 111, such as a brush, airbrush nozzle, sponge, and dispenser. In some arrangements, the cosmetic distribution system 108 includes a plurality of applicator devices 109 (e.g., 109*a*, 109*b*, and 109*c*), each applicator device 109 configured to secure a cosmetic applicator 111 (e.g., 111*a*, 111*b*, and 111*c*).

In some arrangements, the cosmetic 107 is in liquid form, the cosmetic distribution system 108 is an airbrush system, and the cosmetic applicator 111 is an airbrush nozzle. The airbrush system 108 atomizes the cosmetic 107 into small droplets by passing a stream of fast-moving air through the applicator device 109, which may include a frame, motor, and air compressor. The small droplets are applied to the user's face immediately after the air stream passes through the airbrush nozzle 111. In some arrangements, the airbrush system 108 may include a plurality of cosmetics 107 and a plurality of airbrush nozzles 111, and each applicator device 109 may be operated sequentially or simultaneously.

A controller 110 is in communication with the navigation system 104 and the cosmetic distribution system 108. The controller 110 is described in greater detail with respect to FIG. 2. One of the functions of the controller 110 is to receive sensor data. The cosmetic application drone 100 includes at least one sensor 112 connected directly or indirectly to the drone body 102 and configured to collect sensor data. The sensor 112 is in communication with the controller 110. The sensor 112 may be part of the navigation system 104 (e.g., the accelerometers, gyroscopes, barometer, and altitude sensors discussed above). The sensor 112 may be located at or within the cosmetic housing 106 (e.g., as a pressure sensor detecting an amount of cosmetic 107 contained within the cosmetic housing 106) or at or within the cosmetic distribution system 108 (e.g., as a flow sensor monitoring the rate at which cosmetic 107 is expelled). Typically, the cosmetic application drone 100 will include a plurality of sensors 112 of many different types. Sensor data collected from the sensors 112 may relate to the face of a user (e.g., face topography, skin tone, and skin texture). A sensor 112 may be a proximity sensor that is configured to collect sensor data relating to safety information (e.g., identify when the drone is approaching a minimum safety distance to the user's face).

A battery 116 is connected to the drone body 102 and in electrical communication with the drone body 102, the navigation system 104, the cosmetic housing 106, the cosmetic distribution system 108, and/or the controller 110. The battery 116 may be rechargeable, as discussed in further detail below.

In addition, the cosmetic application drone 100 may include a lighting system 113 and a camera system 115. The lighting system 113 may be connected to the drone body 102 and configured to provide light during a cosmetic application or during use of the camera system 115. The camera system 115 may be configured to capture images of a user's face. The camera system 115 may be considered a type of sensor 112, and the images captured by the camera system (e.g., of a user's face) may be analyzed and used as sensor data.

Figure 2:
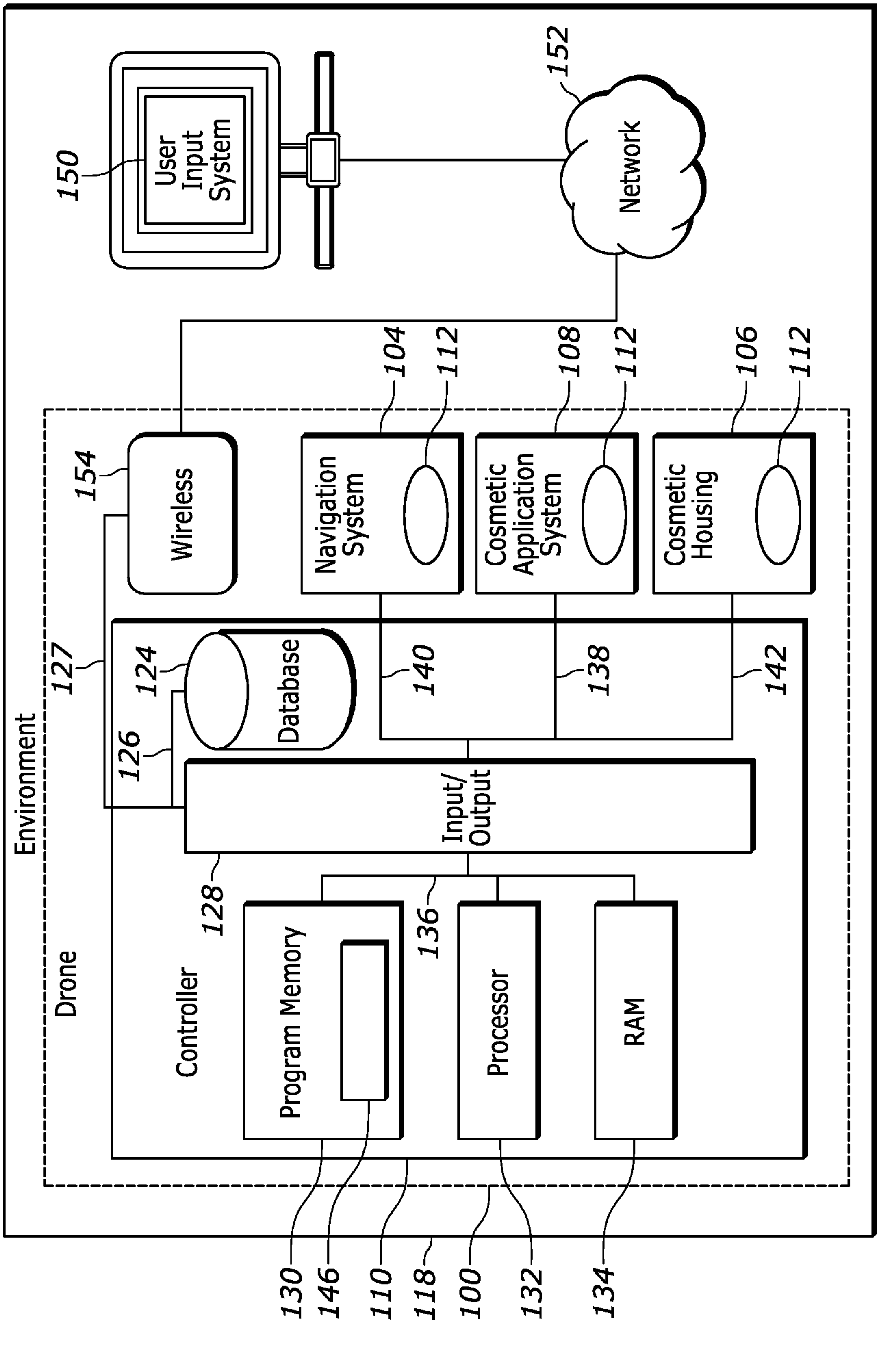
FIG. 2 illustrates schematically the controller of the cosmetic application drone of FIG. 1 in accordance with various examples.

FIG. 2 is an example block diagram of an example controller 110, illustrating the various components used in implementing an example embodiment of a cosmetic application drone 100. The controller 110 is configured to execute the functions of the disclosed embodiments in order to distribute a cosmetic 107 in an environment 118. The controller 110 may be operatively connected to a database 124 via a link 126 connected to an input/output (I/O) circuit 128. The database 124 may store, for example, sensor data from sensor 112. It should be noted that, while not shown, additional databases may be linked to the controller 110 in a known manner. The controller 110 includes a program memory 130, one or more processors 132 (may be called microcontrollers or a microprocessors), a random-access memory (RAM) 134, and the input/output (I/O) circuit 128, all of which are interconnected via an address/data bus 136. It should be appreciated that although only one processor 132 is shown, the controller 110 may include multiple microprocessors 132. Similarly, the memory 130 of the controller 110 may include multiple RAMs 134 and multiple program memories 130. Although the I/O circuit 128 is shown as a single block, it should be appreciated that the I/O circuit 128 may include a number of different types of I/O circuits. The RAM(s) 134 and the program memories 130 may be implemented as semiconductor memories, magnetically readable memories, and/or optically readable memories, for example.

A link 138, which may include one or more wired and/or wireless (Bluetooth, WLAN, etc.) connections, may operatively connect the controller 110 to the cosmetic distribution system 108 through the I/O circuit 128. The cosmetic distribution system 108 may be in fluid communication with the environment 118 for purposes of distributing cosmetic 107. A link 140, which may include one or more wired and/or wireless (Bluetooth, WLAN, etc.) connections, may operatively connect the controller 110 to the navigation system 104 through the I/O circuit 128. A link 142, which may include one or more wired and/or wireless (Bluetooth, WLAN, etc.) connections, may operatively connect the controller to the cosmetic housing 106. In general, any sensor 112 is operatively connected to the controller 110 through the I/O circuit 128 by a link, such as link 138, link 140, or link 142. Other links, such as a link to battery 116, are contemplated as within the scope of this disclosure.

The program memory 130 and/or the RAM 134 may store various applications (i.e., machine readable instructions) for execution by the processor 132. For example, a user input system (such as user input system 202 discussed further below) may generally control the operation of the cosmetic application drone 100 and the controller 110 to implement the processes described herein. The program memory 130 and/or the RAM 134 may also store a variety of subroutines 146 for accessing specific functions of the controller 110.

By way of example, and without limitation, the subroutines 146 may include, among other things:

- a subroutine for controlling the navigation system 104 to fly the cosmetic application drone 100 to collect sensor data relating to a face of a user,
- a subroutine for controlling the sensor 112 to collect the sensor data relating to the face of the user,

- a subroutine for storing the sensor data relating the face of the user in a memory 130 or database 124,
- a subroutine for generating a face map from the sensor data relating to the face of the user,
- a subroutine for controlling the navigation system 104 and the cosmetic distribution system 108 to apply a cosmetic 107 to the user using the face map,
- a subroutine for controlling at least one of the navigation system 104 and the cosmetic distribution system 108 based on safety information,
- a subroutine for controlling the cosmetic distribution system 108 to apply cosmetic 107 to the user using more than one of the plurality of applicator devices 109 (e.g., 109*a*, 109*b*, 109*c*) simultaneously,
- a subroutine for controlling the navigation system 104 and cosmetic distribution system 108 to apply the cosmetic to more than one user,
- a subroutine for analyzing images from the camera system 115 and optionally controlling the navigation system 104 and the cosmetic distribution system 108 based on the analysis of the images,
- a subroutine to provide an application plan based on sensor data from a sensor 112, and
- a subroutine to cease controlling at least one of the navigation system 104 and the cosmetic distribution system 108 when one of the cosmetic housing 106 and the cosmetic distribution system 108 is engaged manually by a user.

The program memory 130 and/or the RAM 134 may further store data related to the configuration and/or operation of the cosmetic application drone 100, and/or related to the operation of the one or more subroutines 146.

In addition to the controller 110, the cosmetic application drone 100 may include other hardware resources. As discussed in greater detail below, the cosmetic application drone 100 may communicate with a user input system 202 through a network 152, using any of a number of known networking devices and techniques (e.g., through a computer network, the Internet, etc.). Specifically, the cosmetic application drone 100 may include a drone wireless communication system 154 connected to the drone body 102 and in communication with the controller 110 via a link 127 and the I/O circuit 128.

With respect to the subroutines 146 relating to generation of a face map, additional information may be found in U.S. patent application Ser. No. 18/443,724, filed Feb. 16, 2024, entitled "Robotic Cosmetic Application Device with Machine Learning and User Preference Integration", which is hereby incorporated by reference in its entirety. As described therein, sensors, such as sensors 112 discussed above, can be used to detect the contours and features of a user's face. The face map can identify the locations of one or more facial features (e.g., eyes, eyelids, eyebrows, eyelashes, checks, cheekbones, nose, lips, chin, etc.) of the user's face. A machine learning model may be used to analyze data associated with a user's face to create the face map (referred to as a "three-dimensional map" in the application incorporated by reference).

Figure 3:
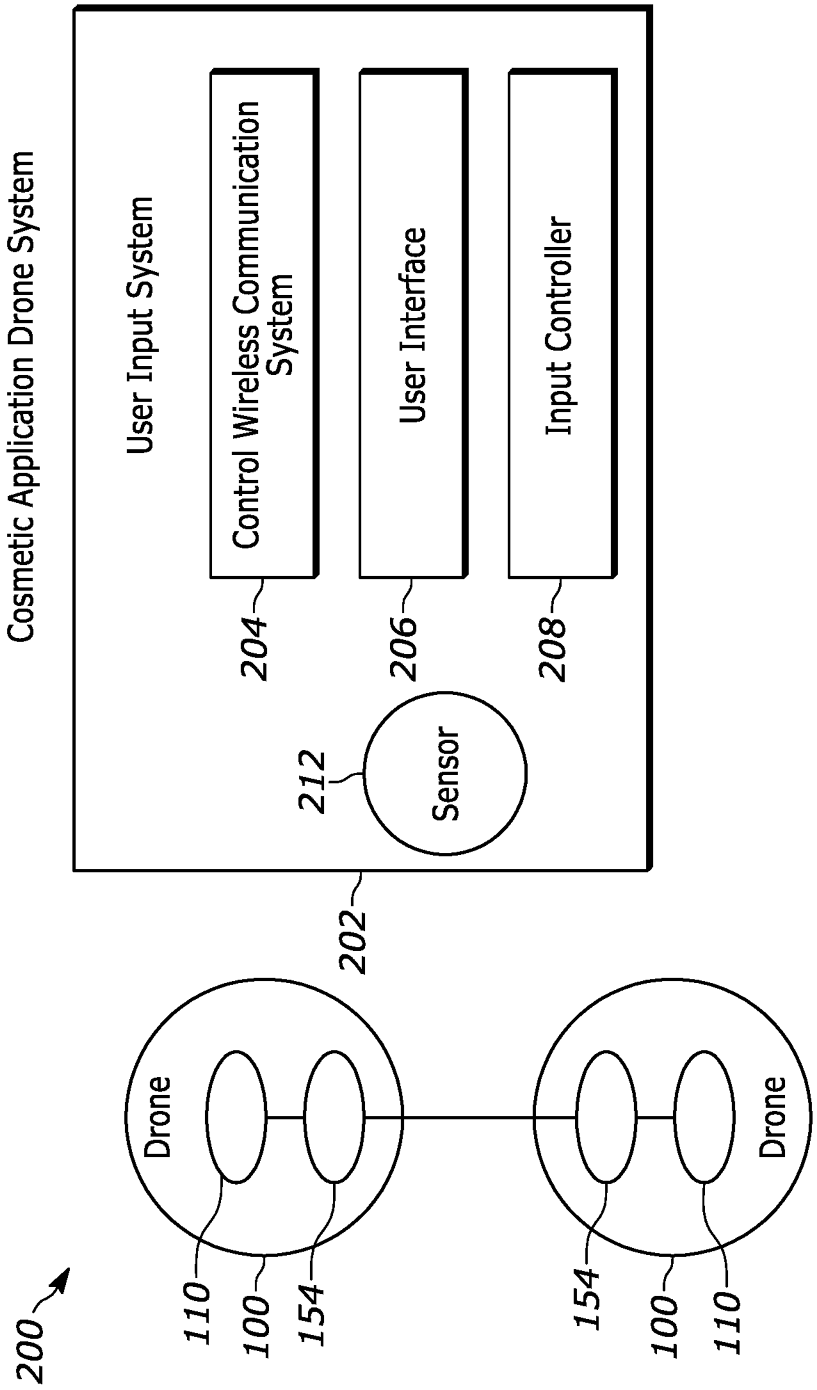
FIG. 3 illustrates schematically a cosmetic application drone system in accordance with various examples.

As shown in FIG. 3, the cosmetic application drone 100 may be part of a cosmetic application drone system 200. The cosmetic application drone system 200 of FIG. 3 is shown with two cosmetic application drones 100. The cosmetic application drone system 200 may include only one cosmetic application drone 100 or more than two cosmetic application drones 100. As shown in FIG. 3, the respective controllers 110 of the cosmetic application drones 100 may be in communication with one another via their respective wireless communication systems 154. A plurality of cosmetic application drones 100 can be configured to apply cosmetic to multiple users simultaneously or to apply cosmetic on a single user simultaneously. In addition to one or more cosmetic application drones 100, the cosmetic application drone system 200 includes a user input system 202 including a control wireless communication system 204 selectively in communication with the drone wireless communication system(s) 154 (shown in FIG. 3), a user interface 206, and an input controller 208 in communication with the control wireless communication system 204.

The user interface 206 of the cosmetic application drone system 200 is configured to display a cosmetic application plan, and the input controller 208 is configured to receive input from a user to change or approve the application plan. The application plan may be based on at least one of previously approved application plans, expected lighting conditions, event information, and makeup style. The expected lighting conditions are either collected as sensor data by at least one sensor 112 or entered into the user interface 206. The user interface 206 is further configured to display a plurality of event types and a plurality of makeup styles. The event information used to determine an application plan is one of the plurality of event types displayed and ultimately selected using the user interface 206, and the makeup style used to determine an application plan is one of the plurality of styles displayed and ultimately selected using the user interface 206. The application plan may further include at least one of a type of cosmetic 107, a shade of cosmetic 107, an application location, an applicator type, and a quantity of cosmetic 107. The user interface 206 is configured to provide at least one of tutorials, tips, and cosmetic recommendations based on the sensor data.

Figure 4:
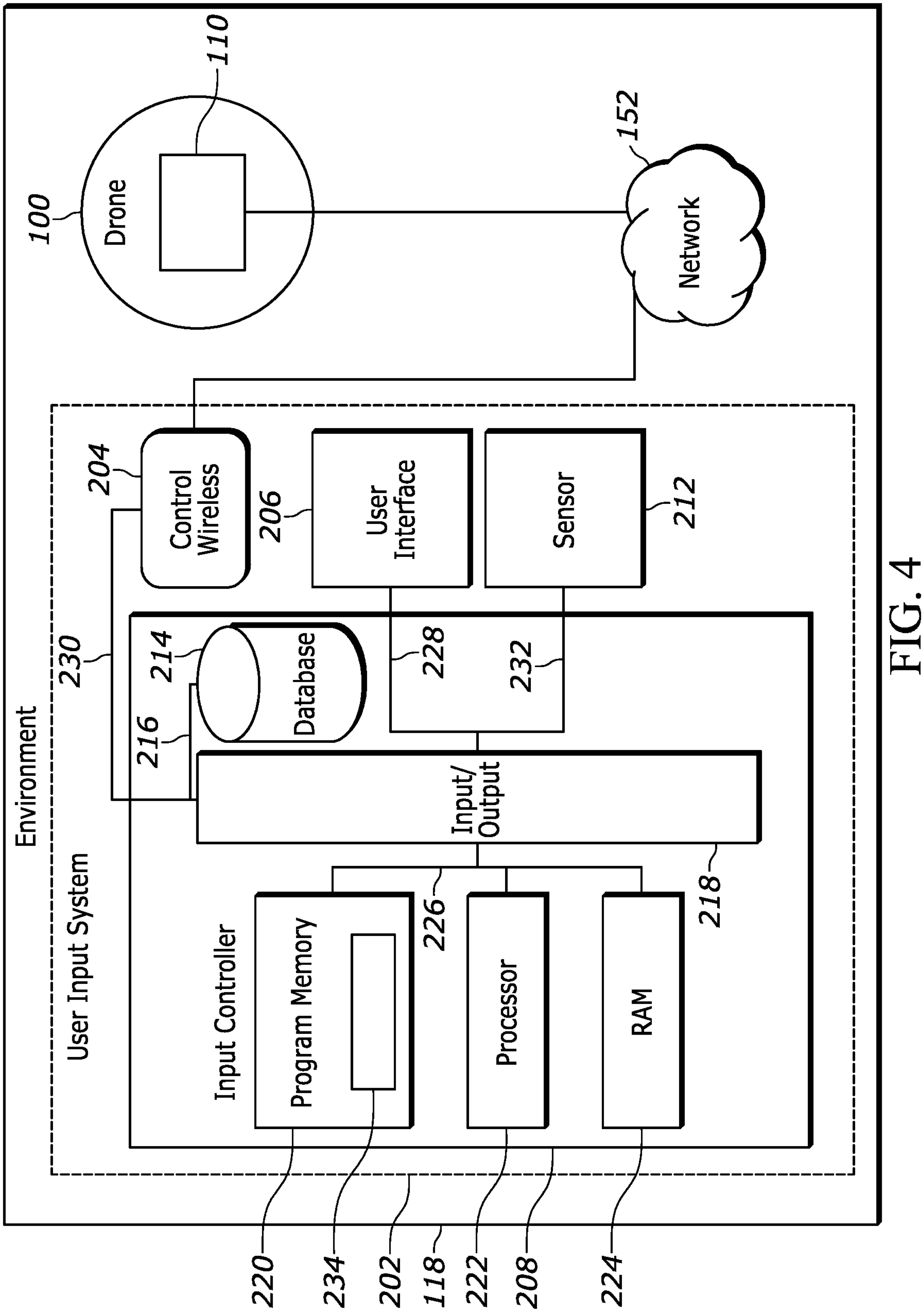
FIG. 4 illustrates schematically the input controller of the user input system of the cosmetic application drone system of FIG. 3 in accordance with various examples.

FIG. 4 illustrates schematically the input controller 208 of the user input system 202. The controller 208 is configured to execute the functions of the disclosed embodiments in order to control operation of the cosmetic application drones 100. The input controller 208 may be operatively connected to a database 214 via a link 216 connected to an input/output (I/O) circuit 218. It should be noted that, while not shown, additional databases may be linked to the input controller 208 in a known manner. The input controller 208 includes a program memory 220, one or more processors 222 (may be called microcontrollers or a microprocessors), a random-access memory (RAM) 224, and the input/output (I/O) circuit 218, all of which are interconnected via an address/data bus 226. It should be appreciated that although only one processor 222 is shown, the input controller 208 may include multiple microprocessors 222. Similarly, the memory 220 of the input controller 208 may include multiple RAMs 224 and multiple program memories 220. Although the I/O circuit 218 is shown as a single block, it should be appreciated that the I/O circuit 218 may include a number of different types of I/O circuits. The RAM(s) 224 and the program memories 220 may be implemented as semiconductor memories, magnetically readable memories, and/or optically readable memories, for example.

A link 228, which may include one or more wired and/or wireless (Bluetooth, WLAN, etc.) connections, may operatively connect the input controller 208 to the user interface 206 through the I/O circuit 218. A link 230, which may include one or more wired and/or wireless (Bluetooth, WLAN, etc.) connections, may operatively connect the input controller 208 to the drone controller 110 through the I/O circuit 128, the control wireless communication system 204, the network 152. Further, any sensor 212 is operatively connected to the input controller 208 through the I/O circuit 128 by a 232. Other links, such as a link to a power source for the user input system 202, are contemplated as within the scope of this disclosure.

The program memory 220 and/or the RAM 224 may store various applications (i.e., machine readable instructions) for execution by the processor 222. The program memory 220 and/or the RAM 224 may also store a variety of subroutines 234 for accessing specific functions of the input controller 208.

Figure 5:
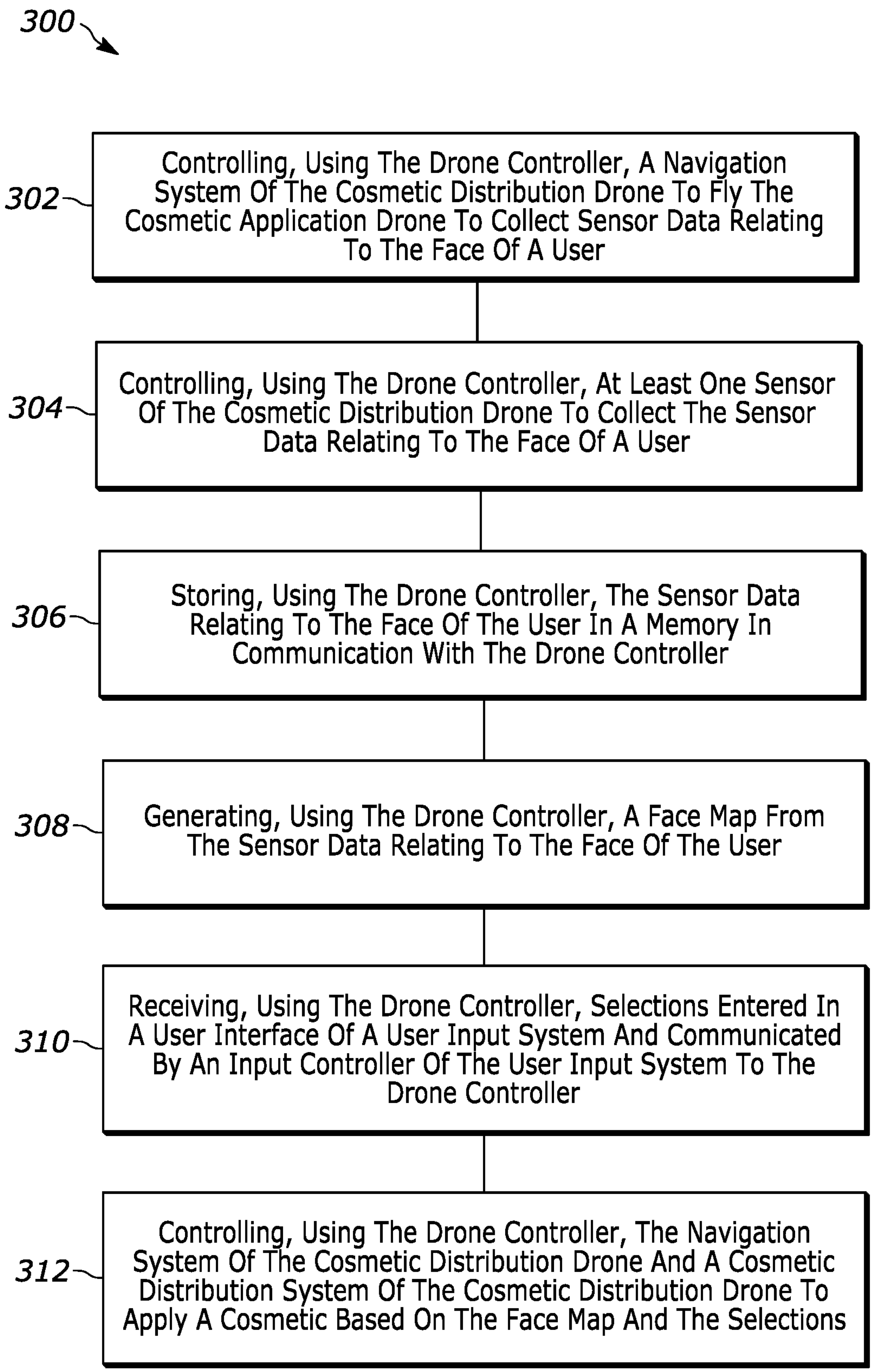
FIG. 5 illustrates schematically a drone-based method of applying cosmetics.

FIG. 5 illustrates schematically a drone-based method 300 of cosmetic application. At box 302, the method 300 includes controlling, using the drone controller 110, the navigation system 104 to fly the cosmetic application drone 100 to collect sensor data relating to the face of a user. At box 304, the method 300 includes controlling, using the drone controller 110, at least one sensor of the cosmetic application drone to collect the sensor data relating to the face of the user. At box 306, the method 300 includes storing, using the drone controller 110, the sensor data relating to the face of the user in the memory 130, which is in communication with the drone controller 110. At box 308, the method 300 includes generating, using the drone controller 110, a face map from the sensor data relating to the face of the user. At box 310, the method 300 includes receiving, using the drone controller 110, selections entered in the user interface 206 and communicated by the input controller 208, to the drone controller 110. The selections may, for example, relate to cosmetic application techniques, quantity of cosmetic to apply, type of cosmetic to apply, and other routine stylistic decisions made by a user when applying a cosmetic. At box 312, the method 300 includes controlling, using the drone controller 110, the navigation system 104 and cosmetic distribution system 108 to apply a cosmetic 107 based on the face map and the selections.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A cosmetic application drone comprising:

a drone body;

at least one sensor connected to the drone body, the at least one sensor configured to collect sensor data;

a navigation system connected to the drone body;

a cosmetic housing connected to the drone body;

a cosmetic distribution system connected to the drone body; and a controller in communication with the at least one sensor, the navigation system, the cosmetic distribution system, the controller including a non-transitory memory and one or more processors;

wherein the non-transitory memory stores instructions that, when executed by the one or more processors, cause the controller to:

control the navigation system to fly the cosmetic application drone to collect sensor data relating to a face, control the at least one sensor to collect the sensor data relating to the face, store the sensor data relating to the face in the memory, generate as a face map from the sensor data relating to the face, and control the navigation system and the cosmetic distribution system to apply a cosmetic to the user using the face map, and cease controlling at least one of the navigation system and the cosmetic distribution system when one of the cosmetic housing and the cosmetic distribution system is engaged manually by a user.

2. The cosmetic application drone of claim 1, the sensor data relating to the face including at least one of face topography, skin tone, and skin texture.

3. The cosmetic application drone of claim 1, the cosmetic housing configured to hold at least one of a foundation, concealer, eyeshadow, eyeliner, mascara, blush, and lipstick.

4. The cosmetic application drone of claim 1, the cosmetic distribution system including an applicator device, the applicator device configured to secure a cosmetic applicator.

5. The cosmetic application drone of claim 4, the cosmetic applicator being an airbrush nozzle.

6. The cosmetic application drone of claim 1 further comprising a rechargeable battery secured to the drone body and electrically connected to at least one of the at least one sensor, the navigation system, the cosmetic distribution system, and the controller.

7. The cosmetic application drone of claim 1, wherein the at least one sensor includes a proximity sensor, the instructions, when executed by the one or more processors, further cause the proximity sensor configured to collect sensor data relating to safety information, and the instructions, when executed by the one or more processors, further cause the controller to control at least one of the navigation system and the cosmetic distribution system based on the safety information.

8. The cosmetic application drone of claim 1 further comprising a lighting system connected to the drone body, the lighting system configured to provide light during makeup application.

9. The cosmetic application drone of claim 1, the cosmetic distribution system including a plurality of applicator devices, each applicator device configured to secure a cosmetic applicator, and wherein the instructions, when executed by the one or more processors, further cause the controller to control the cosmetic distribution system to apply cosmetic to the user using more than one of the plurality of applicator devices simultaneously.

10. The cosmetic application drone of claim 1, where the instructions, when executed by the one or more processors, further cause the controller to control the navigation system and cosmetic distribution system to apply the cosmetic to more than one user.

11. The cosmetic application drone of claim 1 further comprising a camera system configured to capture images of a user's face, wherein the instructions, when executed by the one or more processors, further cause the controller to analyze the images and produce an analysis of the images.

12. The cosmetic application drone of claim 11, wherein the instructions, when executed by the one or more processors, further cause the controller to control the navigation system and the cosmetic distribution system based on the analysis of the images.

13. A drone-based method of applying cosmetics by controlling a cosmetic application drone using a drone controller, the method comprising:

controlling, using the drone controller, a navigation system of the cosmetic application drone to fly the cosmetic application drone to collect sensor data relating to a face;

controlling, using the drone controller, at least one sensor of the cosmetic application drone to collect the sensor data relating to the face;

storing, using the drone controller, the sensor data relating to the face in a memory in communication with the drone controller;

generating, using the drone controller, a face map from the sensor data relating to the face, the face map identifying locations of one or more facial features of the face;

receiving, using the drone controller, selections entered in a user interface of a user input system and communicated by an input controller of the user input system to the drone controller; and controlling, using the drone controller, the navigation system of the cosmetic application drone and a cosmetic distribution system of the cosmetic application drone to apply a cosmetic to the face based on the face map and the selections.

* * * * *